(No Model.)

J. HORSCROFT
POTATO PLANTER.

No. 503,854. Patented Aug. 22, 1893.

Witnesses:
May. J. Tedford.
Willard P. Cave

Inventor:
John Horscroft

UNITED STATES PATENT OFFICE.

JOHN HORSCROFT, OF MOBERLY, MISSOURI.

POTATO-PLANTER.

SPECIFICATION forming part of Letters Patent No. 503,854, dated August 22, 1893.

Application filed August 26, 1892. Serial No. 444,247. (No model.)

*To all whom it may concern:*

Be it known that I, JOHN HORSCROFT, of Moberly, in the county of Randolph and State of Missouri, have invented a certain new and useful Improvement in Potato-Planters, of which the following is a full, clear, and exact description, reference being had to the accompanying drawings, forming part of this specification.

My invention relates to certain improvements in machines for planting potatoes.

My invention consists in features of novelty hereinafter fully described and pointed out in the claim.

Figure 1:
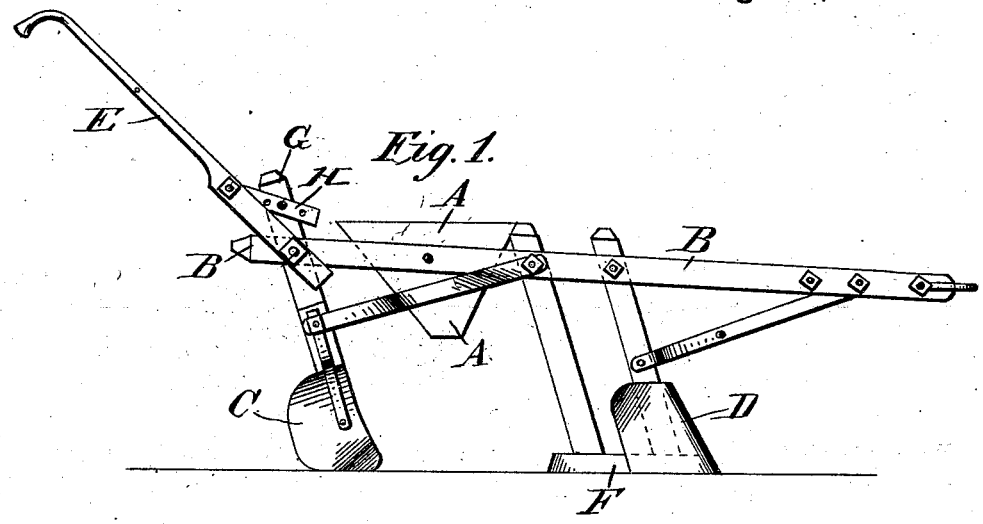
Figure 2:
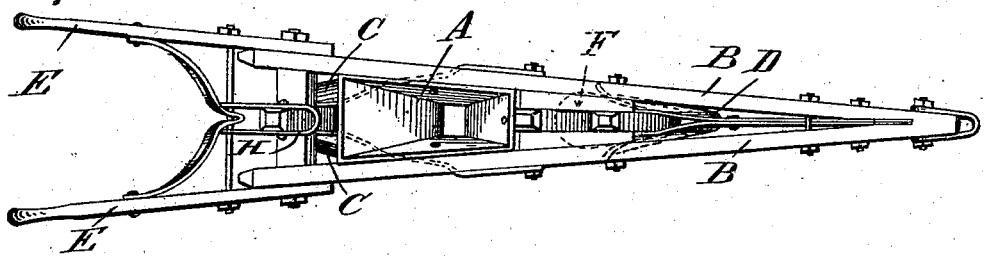
Figure 3:
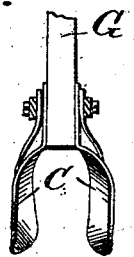

Figure 1 is a side elevation of my improved machine. Fig. 2 is a top or plan view. Fig. 3 is a detail view, showing the covering plow in elevation.

Referring to the drawings, B represents the main frame of the machine.

E are the handles which may be adjusted in height by a strap H having a number of perforations to receive a pin, which connects the strap to a standard G to the lower end of which the covering plow C is attached. The standard G is made fast to the frame B, as shown. The covering plow C has two shares placed at an angle to the line of draft, as shown in Fig. 3, so as to throw the dirt into a furrow, (into which the potatoes have been dropped,) formed by a front plow D located on the lower end of a standard projecting downwardly from the frame B. Extending rearwardly from the plow D is a flat shoe F, flaring back from the plow the function of which is to form a well defined bottom to the furrow made by the plow D, so that the potatoes will have a flat surface upon which to fall and spread themselves, and not be heaped one on another.

A represents a hopper or chute into which the potatoes are dropped by hand, and which deposits them into the furrow in advance of the plow C.

The machine is a durable, light and inexpensive one, and is very effectual for the purpose for which it is intended.

I claim as my invention—

In a potato planter, the combination of a frame provided with handles, a plow secured to the forward part of the frame, a flat shoe located behind said plow and flaring backwardly therefrom, a covering plow located behind said shoe, and a hopper, located between said shoe and the covering plow; substantially as and for the purpose set forth.

JOHN HORSCROFT.

Witnesses:
   J. P. TRIMBLE,
   JNO. S. WILLIS.